United States Patent Office 3,711,309
Patented Jan. 16, 1973

3,711,309
METHOD OF SEALING LEAKS IN VESSELS AND JOINTS
Joseph J. Packo, 3600 N. Federal Highway, Fort Lauderdale, Fla. 33308
No Drawing. Filed May 3, 1971, Ser. No. 139,836
Int. Cl. B23p 7/04; C09k 3/10
U.S. Cl. 117—2 R
16 Claims

ABSTRACT OF THE DISCLOSURE

Leaks in pipes, pipelines and pipe systems, conduits, closed containers, tanks and other vessels are sealed by introducing into the interior of the vessel a gaseous, volatilized or liquid volatilizable alcohol or glycol ether, applying pressure on the interior of the vessel sufficient to permit escape of the alcohol or the glycol ether from a leak present in the vessel into the ambient environment, and then introducing into the vessel a gaseous or volatilizable sealant agent capable of reacting with the alcohol or glycol ether present to form a solid seal in the situs of the leak. Alternatively, the sealant agent can be introduced first into the interior of the vessel followed by introduction of the alcohol or glycol ether.

BACKGROUND OF THE INVENTION

The present invention relates to a novel process for sealing leaks in pipes, pipelines and vessels.

In an article entitled "Detection, Repair, and Prevention of Gas Leaks," published in the American Gas Journal, August 1959, pages 16–28, it is indicated that the amount of fuel gas lost from pipelines through leakage represents a great economic burden as well as a potential safety hazard. In addition, the leakage of fuel gas reduces the effective capacity of a gas distribution system. Another adverse effect of leakage is a reduction in the level of pressure in the distribution mains below desirable limits.

GENERAL DESCRIPTION OF THE INVENTION

In accordance with the present invention, there is provided a novel process for sealing leaks in pipes, pipelines and pipe systems, conduits, closed containers, tanks, and closed systems adapted to contain fluids, all of which are hereinafter referred to generally as a vessel.

The process of the invention is particularly adapted for sealing very small leaks in underground piping systems used for conveying fuel gas, as well as for sealing leaks in telephone conduits containing nitrogen or other inert gas under pressure.

The invention not only eliminates leakage of gas into the atmosphere, but also into the surrounding soil or through joint packing materials. The air and the other surrounding materials which may be involved in the sealing operation are accordingly referred to herein as the ambient environment.

The method of sealing leaks in a vessel and the like adapted for containing a fluid therein, in accordance with a first aspect of the invention, comprises the steps of introducing into the interior of the vessel a gaseous, volatilized or liquid volatilizable alcohol or glycol ether, applying pressure on the interior of the vessel sufficient to permit escape of the alcohol or the glycol ether from a leak present in the vessel into the ambient environment, and then introducing into the vessel a gasous or volatilizable sealant agent capable of reacting with the alcohol or glycol ether at the situs of the leak to form a solid reaction product and thus to form a solid seal at the situs of the leak.

Where the ambient environment is of a type which provides a matrix in which the reaction of the alcohol or glycol ether and the sealant agent can take place, such as, for example, soil surrounding a buried pipeline, the portion adjacent to the situs of the leak would become saturated with the escaping alcohol or glycol ether vapor and would form an additional support for a solid mass of reacted sealant at the exit of the leak, thereby strengthening the seal.

In accordance with an alternative procedure, there is first introduced into the interior of the vessel a gaseous or volatilized or volatilizable sealant agent, pressure is applied to the interior of the vessel sufficient to permit escape of the sealant agent from a leak present in the vessel into the ambient environment, and then introducing into the interior of the vessel a gaseous, volatilized or liquid volatilizable alcohol or glycol ether capable of reacting with the sealant agent at the situs of the leak to form a solid reaction product and thus to form a solid seal at the situs of the leak. This is less desirable than the first alternative where the surrounding soil contains substantial amounts of moisture inasmuch as a portion of the sealant agent escaping from the leak may, in such case, react with the moisture and be consumed and unavailable to react subsequently with the alcohol or glycol ether vapors.

In accordance with a third alternative method, according to the invention, the gaseous or volatilized or volatilizable sealant agent is introduced into the interior of the vessel, pressure is applied to the interior sufficient to permit escape of the sealant agent from the leak into the ambient environment, while introducing into the ambient environment at the situs of the leak, the gaseous, volatilized, or volatilizable liquid alcohol or glycol ether capable of reacting with the sealant agent to form a solid seal at the situs of the leak. This method would involve, for example, applying the alcohol or glycol ether into the ambient environment by injecting a stream of the vapors through a hollow pipe or lance, but has the drawback that the situs of the leak would have to have been preliminarily located, which may be time-consuming and expensive, and moreover, the type of soil, such as hard clay, which is difficult to penetrate, may make this alternative impractical in a given situation.

In the general practice of the process of the invention, the interior of the vesel is first purged with a dry non-reactive gas to remove moisture and/or oxygen which might react with the sealant agent, this action taking place by displacement. Suitable non-reactive gases for this purpose include nitrogen, helium, argon or dry natural gas. The alcohol or glycol ether, or the sealant agent, as the case may be, is then introduced into the interior of the vessel in gaseous form or distributed in or in admixture with a suitable inert gaseous vehicle.

However, it is also within the contemplation of the invention that if moisture and/or oxygen is present, either the alcohol or glycol ether, or the sealant agent, can be introduced into the interior of the vessel directly, in gaseous form, or in a suitable inert gaseous vehicle, whereby the gaseous alcohol or glycol ether, or sealant, per se acts to purge the vessel by removing the moisture and/or oxygen by displacement, even though some of the sealant agent may be consumed thereby, but these materials will also produce the desired seal. Thus, it is not required that the purging be done only by means of a separate inert gas, but the sealant itself, or the alcohol or glycol ether, may be utilized for this purpose. Furthermore, if no moisture and/or oxygen is present, then purging is unnecessary, and the reactants will perform their function directly.

It may also be desirable under some circumstances, although not necessary as a rule, to perform a second similar purging step with a dry non-reactive inert gas following the initial introduction of either the alcohol or glycol ether, or the sealant agent, as the case may be. Thereafter, the sealant agent or the alcohol or glycol ether charge is introduced. Such an intermediate purge might be required where the presence of moisture and/or oxygen in the vessel presents a special problem.

The sealant agents suitable for use in this invention are selected normally gaseous or volatile or readily volatilizable metal alkyls, metal alkyl halides, and metal alkyl hydrides. These sealant agents are introduced into the vessel preferably in admixture with a non-reactive vehicle gas such as hydrogen, helium or nitrogen which will not react with the sealant agent, under suitable pressure.

The sealant agents just mentioned are those which are capable of reacting with a volatile or readily volatilizable alcohol or glycol ether to produce a solid seal at the situs of the leak. In the case of the metal alkyls, metal alkyl halides and metal alkyl hydrides, the reaction product will ordinarily be a metal alkoxide.

The sealing process of the invention is particularly useful in sealing leaks in underground pipelines where the leakage may take place at jute caulked joints or into surrounding soil. In such cases a matrix of either jute or soil is available to absorb either the alcohol or glycol ether, or the sealant agent, as the case may be, thus providing a place for the reaction to take place and to form the desired solid seal.

The sealant agents are introduced in a concentration which depends upon the size and shape of the vessel and the conditions of the ambient environment. The concentration of sealant agent will generally range from about 50 parts per million to about 10% by weight of the gas contained in the vessel, or of the inert vehicle or carrier gas where one is used. Where the sealant agent is not gaseous, but nevertheless volatilizable, it may be vaporized or else may be dissolved in a suitable volatile organic solvent, such as a hydrocarbon, such as, for example, butane, hexane, heptane, benzene, and the like, which will uniformly volatilize or disperse in the vehicle gas.

The sealant agents are preferably gaseous at ordinary temperature and pressure. However, agents may be used which are volatilizable liquids having relatively low boiling points at atmospheric pressure, or which have a vapor pressure such that they are readily volatilizable in the temperature range of about 0° C. to about 100° C. (which is the range encountered, for example, in underground pipelines), to provide a concentration of at least about 10 parts per million in the pipeline. In any case, the amount and volatility of the sealant agent must provide a sufficient concentration to form a solid seal at the ambient temperature. In the case of a gas pipeline, for example, the line pressure may range from as little as 7 ounces up to as high as 100 pounds per square inch, or even higher.

The alcohol or glycol ether employed to react with the sealant agent should be one having a sufficient volatility to give a concentration of at least about 10 parts per million at the ambient temperature at the leak situs. Thus, the alcohol or glycol ether vapors may also be applied so as to saturate the surrounding joint packing or soil in the manner previously described.

As indicated above, the sealant agents suitable for use in the practice of the invention include metal alkyls, metal alkyl halides, and metal alkyl hydrides. The following discussion of these various categories and their properties, and the various exemplifications thereof, are intended to provide a better understanding of the practice of the invention, but the examples given are not to be considered as limiting the invention thereto.

METAL ALKYLS

There may be employed, in accordance with the invention, alkyls of divalent metals of Group II–B of the periodic system, example of such metals being zinc and cadmium. These divalent metal alkyls will have the formula:

$$MRR'$$

wherein M is zinc or cadmium, and R and R' are identical or different straight or branched chain alkyl having 1 to 8 carbon atoms. These compounds are liquid at ordinary temperature, and many are strongly pyrophoric. Examples include: dimethyl zinc, B. 46° C., diethyl zinc, B. 118° C., vapor pressure 30 mm. Hg at 27° C., di-n-propyl zinc, B. 160° C., vapor pressure 48 mm. Hg at 10° C., di-isopropyl zinc, ethyl-n-propyl zinc, n-propyl-n-butyl zinc, methyl ethyl zinc, di-n-butyl zinc, di-isobutyl zinc, isobutyl-isoamyl zinc, di-isoamyl zinc, methyl propyl zinc, and dioctyl zinc.

Corresponding cadmium alkyls include dimethyl cadmium, B. 105° C., diethyl cadmium, and di-isobutyl cadmium.

There may also be utilized for this component of the sealant agent of the invention, alkyls of trivalent metals of Group III–A of the periodic system, such metals including aluminum, indium, gallium, and thallium. These trivalent metal alkyls will have the formula:

$$XR_3$$

wherein X is aluminum, indium, gallium or thallium, and R is identical or different straight or branched chain alkyl having 1 to 10 carbon atoms. These compounds are liquid at ordinary temperature, and many are pyrophoric. Examples of aluminum alkyls include: trimethyl aluminum, B. 126° C., triethyl aluminum, B. 207° C., tri-n-propyl aluminum, triisopropyl aluminum, B. 225° C., tri-n-butyl aluminum, triisobutyl aluminum, tri-n-hexyl aluminum, tris (isohexyl) aluminum, tris(2-methyl-pentyl) aluminum, tri-n-octyl aluminum, and tri-n-decyl aluminum; also methyl diethyl aluminum, dimethyl ethyl aluminum, and methyl di-isopropyl aluminum.

Similar alkyls of gallium which may be used include trimethyl gallium, B. 55.7° C., triethyl gallium, B. 143° C., and tetramethyl di-galline 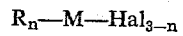 B. 172° C.

Alkyls of indium include: trimethyl indene, B. 135.8° C., triethyl-indene, B. 144° C., and tripropyl-indene, B. 178° C.

Alkyls of thallium include: trimethyl-thallane, B. 147° C.

METAL ALKYL HALIDES

These are compounds of trivalent metals of Group III–A of the periodic system, and are mainly compounds in which the metal is aluminum, having the formula:

$$R_n—M—Hal_{3-n}$$

wherein M is a trivalent metal such as aluminum, R is straight or branched chain alkyl having 1 to 8 carbon atoms, and n is 1 or 2, and Hal is chlorine, bromine, fluorine or iodine.

These compounds are also normally liquids. Examples include: ethyl aluminum sesquichloride, diethyl aluminum chloride, B. 208° C., vapor pressure 41 mm. Hg at 12° C., ethyl aluminum dichloride, M. 22° C., B. 194° C., vapor pressure 41 mm. Hg at 12° C., diethyl aluminum chloride etherate $(C_2H_5)_2Cl—Al—(C_2H_5O)_2$, dimethyl aluminum chloride, methyl aluminum sesquichloride $(Al_2(CH_3)_3Cl_3$, B. 127–148° C., diisobutyl aluminum chloride, isobutyl aluminum dichloride, diethyl aluminum iodide, vapor pressure 4 mm. Hg at 118° C., diethyl aluminum fluoride, vapor pressure 1–2 mm. Hg at 90–100° C., and ethyl isobutyl aluminum chloride.

METAL ALKYL HYDRIDES

These are compounds of trivalent metals of Group III–A of the periodic system, and are mainly compounds in which the metal is aluminum, having the formula:

wherein M is a trivalent metal such as aluminum, R is straight or branched chain alkyl having 1 to 8 carbon atoms, and $n$ is 1 or 2.

These compounds are normally liquids. Examples include: aluminum diethyl hydride, di-isobutyl aluminum hydride, B. 225° C., and the mixed hydride $$[(CH_3)_2AlH)]—[(CH_3AlH_2)]$$

also dimethyl aluminum hydride, di-n-propyl aluminum hydride, di-n-butyl aluminum hydride, di-isobutyl aluminum hydride, di-n-hexyl aluminum hydride, di-n-dodecyl aluminum hydride, methyl-propyl aluminum hydride, and ethylbutyl aluminum hydride.

The suitable sealant agents of the invention are those members of the foregoing categories which are capable of reacting with an alcohol or a glycol ether to form a solid seal.

The alcohols suitable for use in the practice of the invention are those which are volatile or readily volatilizable and capable of reacting with the foregoing categories of sealant agents to form a solid seal. Suitable alcohols include primary, secondary, and tertiary alkanols, and alkenols, and aralkanols, and the like. Examples of suitable primary alkanols include methanol, ethanol, n-propanol, n-butanol, n-hexanol, n-octyl alcohol, and dodecyl (laryl) alcohol. Examples of secondary alcohols include: isopropanol, isobutanol, and iso-octyl alcohol. Examples of tertiary alcohols include: tertiary butanol and tertiary amyl alcohol. Examples of alkenols include allyl alcohol and propenyl alcohol. Examples of aralkanols include benzyl alcohol and phenyl ethyl alcohol.

The following equations are intended to illustrate typical reactions taking place between the various categories of sealant agents and the alcohols, but are not to be regarded as limiting. All of these reactions proceed stepwise to complete alcoholates, i.e. in the case of a metal alkyl, such as, for example, zinc diethyl, the reaction may be represented as:

$$R_2Zn + 2R'OH \rightarrow Zn(OR')_2 + 2RH \quad (1)$$

or in the case of an aluminum alkyl, as:

$$R_3Al + R'OH \rightarrow R_2AlOR' + RH \quad (2)$$

$$R_2AlOR' + R'OH \rightarrow RAl(OR')_2 + RH \quad (2a)$$

$$RAl(OR')_2 + R'OH \rightarrow Al(OR')_3 + RH \quad (2b)$$

Reaction 2 is described, for example, in the article by Davidson and Brown, JACS, vol. 64, pp. 316–324 (1942).

Dialkyl aluminum halides, for example, are reacted with alcohols according to the equation:

$$R_2AlCl + R'OH \rightarrow R_2AlOR' + HCl$$

Dialkyl aluminum hydrides are reacted with alcohols according to the equation:

$$R_2AlH + R'OH \rightarrow R_2AlOR' + H_2 \quad (3)$$

Reaction 3 is described in Annalen, vol. 629, p. 23.

The glycol ethers suitable for use in the practice of the invention are those which are volatile or readily volatilizable and capable of reacting with the foregoing categories of sealant agents to form a solid seal. Suitable glycol ethers include, for example, diethylene glycol monomethyl ether, diethylene glycol dimethyl ether, diethylene glycol monoethyl ether and diethylene glycol diethyl ether.

It will be understood that there may be employed in the practice of the invention, either a mixture of various selected sealant agents of the classes described, or a mixture of two or more of the alcohols or glycol ethers, or both, depending upon particular types of conditions. Thus, there may be employed a mixture of two metal alkyls, such as triethyl aluminum and diethyl zinc, or a mixture of two alcohols, such as methanol and ethanol.

The reaction of the sealant agent and the alcohol or glycol ether will ordinarily take place at the ambient temperature, which may range from about 0° F. to about 100° F. under the usual climatic conditions.

DESCRIPTION OF THE PREFERRED EMBODIMENTS

The following examples serve to illustrate the practice of the invention, but are not to be regarded as limiting:

EXAMPLE 1

A steel pipe section (7 feet long, ¾" diameter is drilled with a ⅛" hole to simulate a leak. One end of the test pipe is connected to a valve-controlled feed line connected to a source of dry nitrogen gas for purging the pipe of any moisture or oxygen, and also serving as an inert gas carrier or vehicle for the sealant agent. Pressure and flow indicators and monitors are also connected in the feed line. The other end of the test pipe is connected to a valved outlet line connected to a pressure gage and pressure recorder. The test pipe is first purged with a stream of nitrogen gas to remove oxygen and moisture. The room temperature ranges from 68° to 76° F. A stream of methanol vapor under a slight pressure of 5 pounds to the square inch is introduced into the test pipe so as to fill it completely and to cause the vapor of the methanol to escape from the ⅛" leak hole into a surrounding closed chamber in which the test pipe is enclosed. Thereafter diethyl zinc in approximately a concentration of 500 p.p.m. is introduced in a nitrogen stream into the test pipe and reacts with the methanol vapor to form a solid reaction product which seals the leak hole and the outer opening area with a solid plug.

EXAMPLE 2

In order to seal a leak in a fuel gas pipeline buried underground, there is introduced into the pipeline at a localized area a stream of ethanol vapor in natural gas, or $N_2$ under a slight pressure sufficient to permit escape through the leak and saturation of the soil surrounding the pipe with the ethanol. Thereafter the ethanol vapors are purged from the pipeline by means of a charge or "pig" of nitrogen gas so as to drive the alcohol vapors into the ambient soil environment. There is introduced into the pipeline triethyl aluminum in a concentration of about 2,000 p.p.m. The triethyl aluminum vapors which are also under slight pressure, find their way to the situs of the leak and react there with the ethanol previously saturated into the soil to form a solid reaction product and thus a solid seal at the situs of the leak and the outer opening area thereof.

EXAMPLE 3

Proceeding as in Example 2, there is employed as the sealant agent, a mixture of approximately equal concentrations of diethyl zinc and triethyl aluminum (1000 p.p.m. of each), and methanol vapor is employed as the alcohol component. A solid seal is formed in and surrounding the situs of the leak.

What is claimed is:

1. The method of sealing leaks in a vessel and the like adapted for containing a fluid therein which comprises the steps of introducing into the interior of the vessel a gaseous, volatilized or liquid volatilizable compound selected from the group consisting of an alcohol and a glycol ether, applying pressure on the interior of the vessel sufficient to permit escape of the alcohol or glycol ether through a leak present in the vessel into the ambient environment, and then introducing into the vessel a gaseous or volatilizable sealant agent capable of reacting with the alcohol or glycol ether present selected from the group consisting of a metal alkyl, a metal alkyl halide, and a metal alkyl hydride, thereby forming a solid seal in the situs of the leak.

2. The method of claim 1 in which the sealant agent is admixed with a vehicle gas inert thereto.

3. The method of claim 1 in which the seal forming reaction takes place at prevailing temperature conditions.

4. The method of claim 1 in which the interior of said vessel is first purged to remove air and moisture therefrom.

5. The method of claim 4 in which the purge is performed by displacement by an inert gas.

6. The method of claim 1 in which the sealant agent is an aluminum alkyl.

7. The method of claim 1 in which the sealant agent is a zinc alkyl.

8. The method of claim 1 in which the sealant agent is triethyl aluminum.

9. The method of claim 1 in which the sealant agent is diethyl zinc.

10. The method of claim 1 in which the sealant agent is a mixture of triethyl aluminum and diethyl zinc.

11. The method of claim 1 in which the alcohol is an aliphatic alcohol having from 1 to 12 carbon atoms.

12. The method of claim 1 in which the alcohol is methanol.

13. The method of claim 1 in which the alcohol is ethanol.

14. The method of claim 1 in which the interior of the vessel is purged to remove air and moisture therefrom following introduction of the alcohol or the glycol ether and preceding the introduction of the sealant agent.

15. The method of sealing leaks in a vessel and the like adapted for containing a fluid therein which comprises the steps of filling said vessel with a gaseous or volatilized sealant agent selected from the group consisting of a methyl alkyl, a metal alkyl halide, and a metal alkyl hydride capable of reacting with a volatile or readily volatilizable compound selected from the group consisting of an alcohol and a glycol ether to form a solid reaction product, applying pressure on the interior of said vessel sufficient to permit escape of said sealant agent through a leak present in said vessel into the ambient environment, and then introducing into the vessel vapors of said alcohol or glycol ether, thereby forming a solid seal at the situs of the leak.

16. The method of claim 15 in which the vapors of the alcohol or the glycol ether are introduced directly into the ambient environment at the situs of the leak to form a solid seal at said situs.

References Cited

UNITED STATES PATENTS

| 3,578,479 | 5/1971 | Packo | 117—2 |
|---|---|---|---|
| 3,608,000 | 9/1971 | Anderson | 264—36 |
| 3,634,560 | 1/1972 | Anderson | 117—106 X |
| 3,356,777 | 12/1967 | Barrett | 264—36 |
| 3,523,035 | 8/1970 | Whitlow | 117—107.2 X |
| 2,315,554 | 4/1943 | Skeen | 106—33 X |
| 3,637,416 | 1/1972 | Misch et al. | 117—106 X |
| 3,598,636 | 8/1971 | Honeycutt | 117—95 |
| 3,483,053 | 12/1969 | Miserentino et al. | 106—33 X |
| 3,507,725 | 4/1970 | Hylak et al. | 138—97 X |

OTHER REFERENCES

Journal of the American Chemical Society, Davidson et al., vol. 64, pp. 316–324, 1942.

WILLIAM D. MARTIN, Primary Examiner

H. J. GWINNELL, Assistant Examiner

U.S. Cl. X.R.

106—33; 117—95, 106 A; 138—97; 264—36